(12) United States Patent
Olson

(10) Patent No.: US 6,865,793 B2
(45) Date of Patent: Mar. 15, 2005

(54) TUBING SPLICER

(75) Inventor: Donald O. Olson, El Cajon, CA (US)

(73) Assignee: Olson Irrigation Systems, Santee, CA (US)

( * ) Notice: Subject to any disclaimer, the term of this patent is extended or adjusted under 35 U.S.C. 154(b) by 138 days.

(21) Appl. No.: 10/222,372

(22) Filed: Aug. 16, 2002

(65) Prior Publication Data
US 2003/0079332 A1 May 1, 2003

Related U.S. Application Data

(60) Provisional application No. 60/313,067, filed on Aug. 16, 2001.

(51) Int. Cl.[7] ................................. B21D 39/00
(52) U.S. Cl. .................. 29/456; 29/516; 29/237; 29/282; 285/245
(58) Field of Search .................. 29/516, 517, 456, 29/237, 272, 282; 285/32, 245, 246, 247, 255

(56) References Cited

U.S. PATENT DOCUMENTS

| | | | | | |
|---|---|---|---|---|---|
| 68,348 | A | * | 9/1867 | Buchanan | .................. 285/247 |
| 178,649 | A | * | 6/1876 | Loftus | ..................... 285/245 |
| 265,218 | A | * | 9/1882 | Chadwick | .................. 285/245 |
| 270,065 | A | * | 1/1883 | Hickman | .................... 285/245 |
| 578,983 | A | * | 3/1897 | Green | ....................... 285/245 |
| 787,529 | A | * | 4/1905 | Muehlberg | ................. 285/246 |
| 1,195,581 | A | * | 8/1916 | Hachman | .................... 285/246 |
| 1,726,238 | A | * | 8/1929 | Pipher | ....................... 285/247 |

* cited by examiner

Primary Examiner—David P. Bryant
(74) Attorney, Agent, or Firm—J. Mark Holland & Associates

(57) ABSTRACT

Apparatus and methods permit splicing or joining a plurality of tubing ends. A central tubular member has a fluid passage therethrough. The tubing ends are mounted over the extremities of the tubular member, and are held in place by a multi-part sleeve around the central member and cooperating detents (on the exterior of the tubular member and on the interior of the sleeve) that pinch or bite the tubing when the sleeve is actuated (such as via a turnbuckle action) to force cooperating pairs of the detents toward each other.

19 Claims, 2 Drawing Sheets

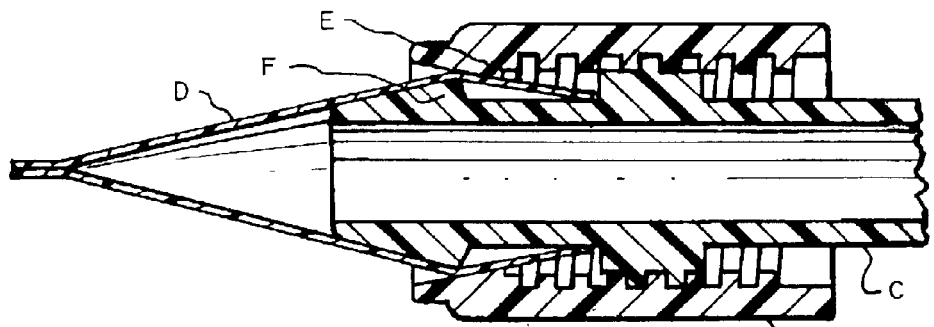
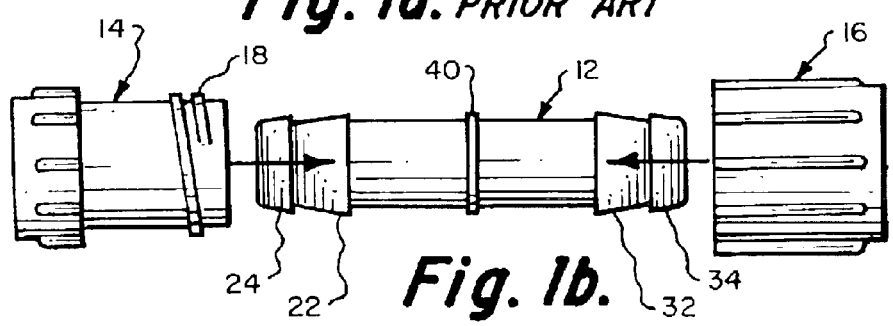
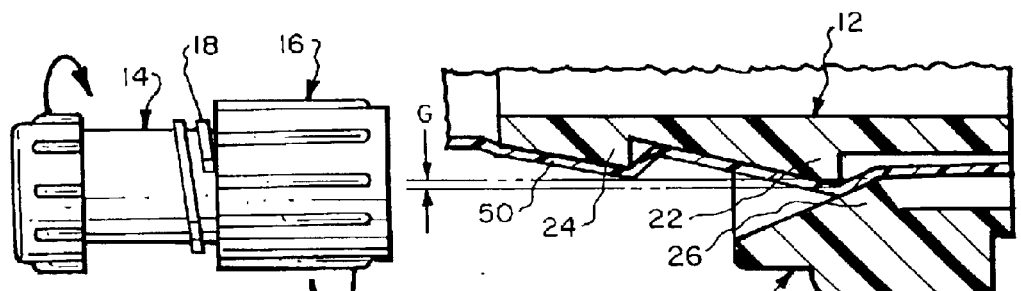
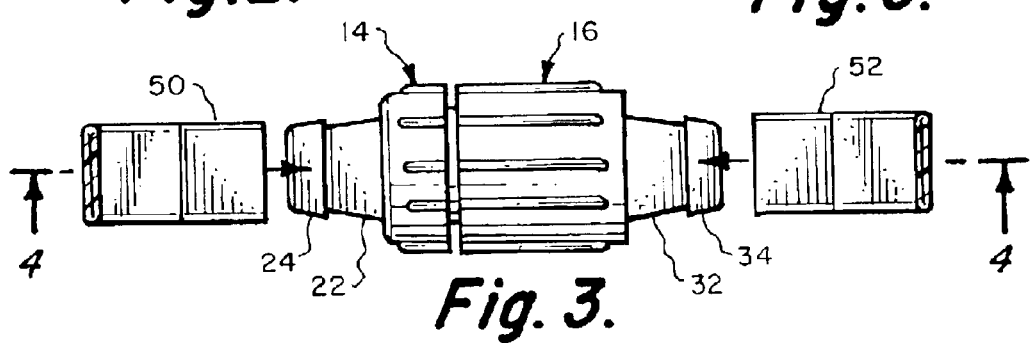

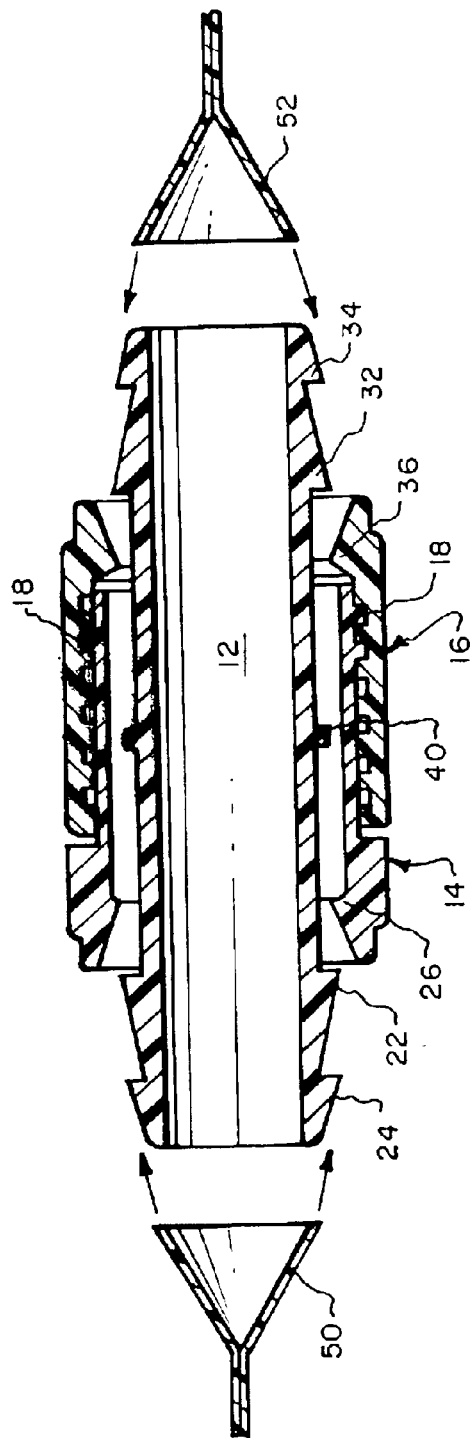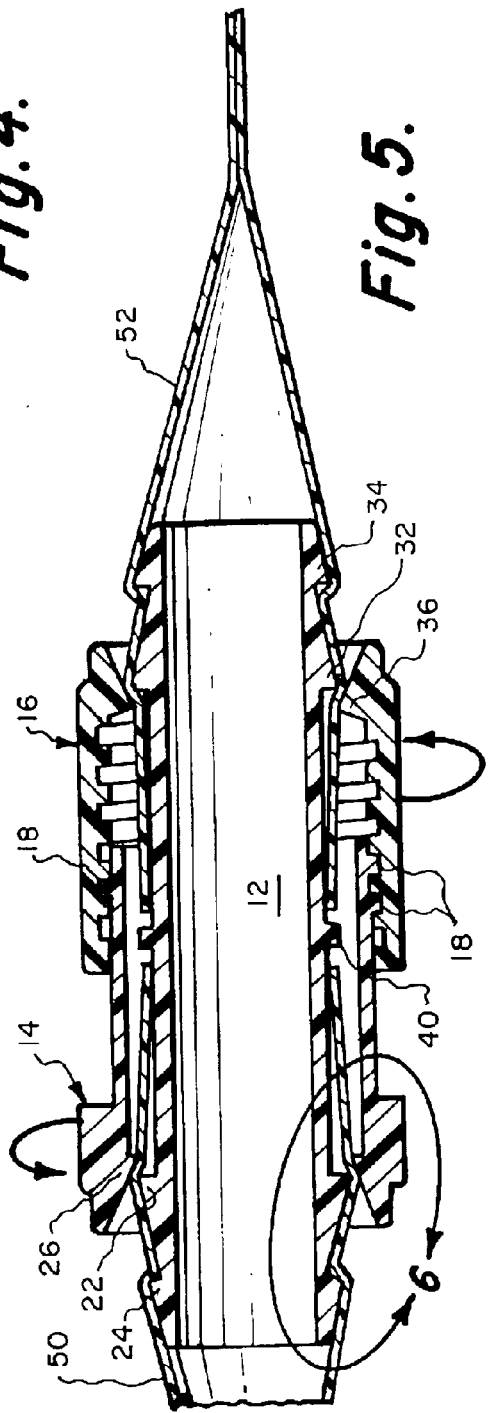

TUBING SPLICER

This application is based on Provisional Application Ser. No. 60/313,067 with a filing dated of Aug. 16, 2001.

BACKGROUND OF THE INVENTION

This invention relates generally to methods and apparatus for joining or splicing tubing, and specifically to methods and apparatus to simultaneously engage a plurality of tubing ends.

There are many situations and applications that require splicing or connecting tubing to other tubing, or to other devices or the like. Prior art approaches include using a sleeve around a central nipple or tubular member, with the tubing end disposed and gripped between the sleeve and nipple. Force or friction is applied to cause detents or teeth on the respective sleeve and nipple pieces to bite into the tubing and hold it in the desired location. Many applications require that this be accomplished with a sufficiently tight seal to prevent leakage.

Among the various approaches in the prior art, some apply force to the detents or teeth via threads acting between the central member and the sleeve, so that rotating those pieces with respect to each other forces the teeth or detents to move axially toward each other and "bite" into the tubing end. FIG. 1a illustrates this prior art concept. Sleeve B and central member C can be rotated with respect to each other so that they are moved axially with respect to each other. Rotation in the proper direction moves the sleeve B to the left relative to member C and engages tubing D between teeth or detents E and F.

For applications in which two pieces of tubing are to be joined to each other, prior art approaches such as just described require that a mirror image of the apparatus be provided or formed on the other end of the central member. Not only is more material required (in order to provide the additional length of the central member, as well as the two separate mating sets of threads—one mating set at each end of the central member), but the assembly of the two ends to the splicing apparatus requires two separate rotations of threaded elements—one rotation or tightening/biting for each tubing end.

OBJECTS AND ADVANTAGES OF THE INVENTION

It is, therefore, an object of the invention to provide an improved method and apparatus for splicing tubing, which simplifies the elements and process required to join a plurality of tubing ends.

The preferred embodiment of the invention provides a central tubular element having a central passageway to permit fluid communication therethrough, such as from a first piece of tubing joined to one end of the central element, through the passageway, and to a second piece of tubing joined to another end of the central element. Biting or retaining elements such as cooperating detent members are positioned at extremities of the passageway on the exterior of the tubular element, and also on the interior of a multi-piece sleeve member positioned around the tubular element. The respective retaining elements or cooperating detent members are positioned to engage the first and second pieces of tubing after those tubing pieces are inserted between them (at the respective ends of the central element). The sleeve member preferably includes actuating elements such as threads acting between the multiple sleeve pieces, so that a single action by a user (such as rotating those sleeve elements with respect to each other) can force the pieces in relatively opposing directions, thereby "simultaneously" engaging each respective pair or group of cooperating detent members with its respective tubing piece. Thus, instead of having multiple sets of threads each requiring its own turning (to tighten or bite into the tubing), the preferred embodiment of the invention uses a single set of threads and a single turning action to bite into multiple tubing ends at the same time.

Another object of the invention is a method that uses apparatus of the aforementioned character, to simplify the assembly or splicing of a multiplicity of tubing pieces.

Other objects and advantages of the invention will be apparent from the following specification and the accompanying drawings, which are for the purpose of illustration only.

BRIEF DESCRIPTION OF THE DRAWINGS

FIG. 1a is a partial sectional view illustrating a prior art approach to joining or splicing tubing. The right-hand end of the assembly (not shown) could be a mirror image of the illustrated left end, or could be otherwise formed or attached to a separate element;

FIG. 1b is an exploded view of a preferred embodiment of the invention, prior to assembly;

FIG. 2 is similar to FIG. 1b, but shows only the two preferred sleeve elements as they can be assembled with each other;

FIG. 3 also is similar to FIG. 1b, but shows the entire preferred assembly as it is about to be engaged to tubing pieces;

FIG. 4 is a sectional view taken along line 4—4 of FIG. 3;

FIG. 5 is similar to FIG. 4, but illustrates the tubing pieces after they have been engaged with the other apparatus; and FIG. 6 is a partial sectional view taken along line 6—6 of FIG. 5.

DESCRIPTION OF PREFERRED EMBODIMENT

A preferred embodiment of the invention is illustrated in FIGS. 1b–6. Preferably, a central tubular member 12 and a multi-part sleeve member (shown as consisting of first sleeve element 14 and second sleeve element 16) cooperate to retain tubing ends 50 and 52 and permit flow therebetween.

Persons of ordinary skill in the art will understand that the various elements of the invention can be fabricated from any of a wide range of suitable materials and methods of manufacture. Preferably, the tubing elements 50 and 52 are extruded or otherwise fabricated from a tough, pliable, somewhat plastic material, so that it can be readily flexed, opened, inserted, and "bitten" as described herein. The coupling or splicing components 12, 14, and 16 are preferably injection molded from lightweight, suitably strong plastic or similar material, but again, can be fabricated from a wide variety of suitable materials.

In addition, persons of ordinary skill in the art will understand that the elements can range widely in their dimensions, so long as their relative sizes allow them to interact in the manner described herein.

Persons of ordinary skill in the art will further understand that the engagement between the tubing elements 50 and 52 and the other elements 12, 14, and 16 is illustrated as utilizing conventional cooperating barbs or teeth. In the drawings, and particularly in FIG. 6, barb 22 on a first end of the central member 12 cooperates with barb 26 on the interior of sleeve element 14 to eventually "bite" the tubing end 50. Barb 32 on a second end of the central member 12 similarly cooperates with barb 36 on the interior of sleeve element 16 to "bite" tubing end 52. As explained below, in the preferred embodiment, those barb pairs 22/26 and 32/36 preferably have an interference fit, illustrated by gap G in FIG. 6.

Although the precise arrangement of the barb elements can vary widely, persons of ordinary skill in the art will understand that preferably the innermost barbs 22 and 32 on the central tubular member 12 are the location at which the desired "biting" or retention of the tubing occurs, and that the outermost barbs 24 and 34 are slightly smaller than their adjacent barbs 22 and 32, and help to keep the tubing centered, among other things. Accordingly, among the many alternative embodiments of the invention (not shown) would be an internal tubular member such as 12 but having only the "biting" interference barbs 22 and 32, and not having the centering barbs 24 and 34.

Moreover, persons of ordinary skill in the art will understand that, as an alternative to the conventional barbs illustrated in the drawings, any suitable engagement means can be utilized to retain the tubing ends between the central tubular member and the sleeve portions (including, by way of example and not by way of limitation, serrated teeth, interrupted barbs, hooks, other interfering structures or elements, or the like). Persons of ordinary skill in the art will also understand that the particular number of barbs and their relative size and spacing from each other can range widely, so long as the desired engagement of the tubing is provided as described herein.

The force applied to "bite" the barbs or teeth into the tubing is preferably supplied by interaction between the two sleeve parts 14 and 16. As best illustrated in FIGS. 5 and 6, in the preferred embodiment shown in the drawings, the interaction is provided by screw threads 18 formed on the exterior of sleeve element 14, that engage a corresponding threaded groove on sleeve part 16. Persons of ordinary skill in the art will understand that the male/female aspects of the threads may be switched in alternative embodiments (so that the thread and not the groove is on the inside of the sleeve portion 16), and that other methods of force generation (not shown) may be provided between the sleeve portions 14 and 16 to accomplish the desired "biting" or other retention of the tubing elements 50 and 52. By way of examples and not by way of limitation, the biting can be provided by an over-center latch (not shown) acting between the sleeve portions 14 and 16 to push them apart from each other, or by one or more adjustable screws mounted on the exterior of the sleeve portions 14 and 16 (with the screw(s) oriented parallel, perpendicularly, or otherwise with respect to the longitudinal axis of the central tubing member 12).

In the preferred method of assembly, the sleeve parts 14 and 16 are threaded together nearly as far or as far as they can be threaded onto each other. That assembly of parts 14 and 16 to each other can occur first (as illustrated in FIG. 2), and that assembly of parts 14 and 16 can then be forced over the central tubular member 12. Alternatively, and as illustrated in FIG. 1b, the sleeve portions 14 and 16 can be placed over the central member 12, and engaged to each other while surrounding that central member 12.

Preferably, the interfering barbs 26 and 36 both end up axially between the central member's interfering barbs 22 and 32, as illustrated in FIGS. 3 and 4. In that interim arrangement, tubing 50 and 52 is not yet involved in the assembly, and preferably interference between the barbs 26 and 36 on the sleeve portions and the respective inner-most barbs 22 and 32 on the central tubular member prevents the sleeve parts 14 and 16 from falling "off" the central tubular member 12 during shipment or handling, etc.

Preferably, the sleeve parts 14 and 16 are "loose" around the tubular member, to facilitate insertion of the tubing 50 and 52. In alternative methods and systems, the sleeve parts could be tightened outwardly (again, in turnbuckle fashion) to snug up to the interfering barbs 22 and 32 and therefore not be "loose" on the central tubular member 12 during shipment and handling. In such alternative embodiments, the sleeve portions 14 and 16 would normally have to be rotated to shorten the sleeve combination 14/16 and thereby "loosen" the interference relationship between the barb pairs 22, 26 and 32, 36, before the tubing ends 50 and 52 could be inserted.

The preferred interference between barbs 26 and 36 is illustrated as gap G in FIG. 6. In other alternative embodiments, the barb pairs 22, 26 and 32, 36 may not actually be an interference fit with each other, but instead may be so closely dimensioned that the insertion of the tubing end 50 or 52 results in an interference relationship, providing the desired engagement of the tubing end. In the preferred embodiment, the ID of the interior barbs 26, 36 is preferably smaller than the OD of their corresponding barbs 22, 32. In that arrangement, even greater force can be applied (via twisting the threads out in the manner of a turnbuckle) than would be withstood by the aforementioned alternative embodiment, thereby permitting an even stronger clamping effect between the barbs and the tubing end.

In the preferred method, the tubing ends 50 and 52 are then inserted onto the central nipple or tubular member 12, and pushed over the barbs 22, 24 (or 32, 34 on the other end) and under the respective sleeve barb 26 or 36. Preferably, the tubing is inserted all the way up against the stop rib 40, although close to the rib 40 is probably sufficient for many embodiments, so long as the insertion provides enough tubing material between the barbs for the desired "biting" and retention. Following insertion of both tubing ends 50 and 52, the sleeve portions 14 and 16 preferably are manipulated (such as by rotating them with respect to each other) to force them axially outward and to cause "biting" engagement of the tubing between the barbs, as shown in FIG. 4. Preferably, further rotation of the sleeve portions 14 and 16 with respect to each other results in tighter "biting" or engagement of the tubing ends 50 and 52.

The apparatus and methods of the invention have been described with some particularity, but the specific designs, constructions and steps disclosed are not to be taken as delimiting of the invention. Obvious modifications will make themselves apparent to those of ordinary skill in the art, all of which will not depart from the essence of the invention and all such changes and modifications are intended to be encompassed within the appended claims.

I claim:

1. Apparatus for splicing ends of tubing to each other, including: a central tubular element having a central passageway to permit fluid communication therethrough and having first cooperating detent members at at least two extremities of the passageway on the exterior of said tubular element; a multi-piece sleeve member positioned around said tubular element and including at least one second cooperating detent member corresponding to each of said first cooperating detent members, each pair of first and second cooperating members sized and configured so as to form an interference fit relative to each other and positioned to engage tubing inserted between said respective pairs of said first and second cooperating detent members, said sleeve member having actuating elements acting between said multiple sleeve pieces to force the pieces in relatively opposing directions upon manipulation by a user to cause said engagement of said respective pairs of first and second cooperating detent members with the tubing.

2. A method of joining two ends of tubing, including the steps of:

providing the apparatus of claim 1;

inserting a first extremity of the central tubular element into a first tubing end and forcing said first tubing end over said first cooperating detent member at that first extremity;

inserting a second extremity of the central tubular element into a second tubing end and forcing said second tubing end over said first cooperating detent member at that extremity; and actuating the multiple sleeve pieces to force the pieces in relatively opposing directions to cause said engagement of said respective pairs of first and second cooperating detent members with the respective first and second tubing ends.

3. An apparatus for splicing ends of tubing including:

a central tubular member having a pair of first cooperating detent members, one of the first cooperating members positioned at a first end and one at a second end of the central tubular member; and a multi-piece sleeve member positioned around the central tubular member, the multi-piece sleeve member including a first sleeve portion and a second sleeve portion each having a second cooperating detent member positioned in an interference relationship with a respective corresponding first cooperating detent member, the first sleeve portion and the second sleeve portion having an actuating element acting therebetween to force the second cooperating detent members into engagement with tubing positioned between the first cooperating detent members and the second cooperating detent members.

4. Apparatus for splicing ends of tubing to each other, including:

a central tubular element having a central passageway to permit fluid communication therethrough and having first cooperating detent members at at least two extremities of the passageway on the exterior of the tubular element; and a sleeve member positioned around said tubular element and having second cooperating detent members positioned in an interference relationship with the first cooperating detent members to retain the sleeve member non-threaded engagement with the central tubular element, the sleeve member having actuating elements acting between multiple pieces thereof to selectively force the pieces in relatively opposing directions.

5. The apparatus for splicing ends of tubing of claim 1 or claim 3 or claim 4, wherein the actuating elements are correspondingly engagable threads.

6. The apparatus for splicing ends of tubing of claim 1 or claim 3 or claim 4, wherein each second cooperating detent member has an inside diamenter smaller than the outside diameter of each first cooperating detent member.

7. The apparatus for splicing ends of tubing of claim 1 or claim 3 or claim 4, further including a centering member positioned outside of each first cooperating detent member.

8. The apparatus for splicing ends of tubing of claim 1 or claim 3 or claim 4, wherein each first cooperating detent member and each second cooperating detent member is a barb configured to bitingly engage adjacent tubing.

9. The apparatus for splicing ends of tubing of claim 1 or claim 3 or claim 4, wherein the central tubular member and sleeve member are each injection molded.

10. The apparatus for splicing ends of tubing of claim 1 or claim 3 or claim 4, further including a stop rib element on the outside of the central tubular member between the first cooperating detent members.

11. A method for splicing ends of tubing, including the steps:

providing the apparatus of claim 1 or claim 3 or claim 4;

inserting the first end of the central tubular member into a first tube end such that the first tube end extends over one of the first cooperating detent members;

inserting the second end of the central tubular member into a second tube end such that the second tube end extends over the other first cooperating detent member; and actuating the multi-piece sleeve member.

12. The method for splicing ends of tubing of claim 11, wherein the actuating elements are correspondingly engagable threads and the step of actuating includes turning the threaded pieces of the sleeve with respect to each other.

13. The method for splicing ends of tubing of claim 11, wherein each second cooperating detent member has an inside diameter smaller than the outside diameter of each first cooperating detent member.

14. The method for splicing ends of tubing of claim 11, further including a centering member positioned outside of each first cooperating detent member.

15. The method for splicing ends of tubing of claim 11, wherein each first cooperating detent member and each second cooperating detent member is a barb.

16. The method for splicing ends of tubing of claim 11, wherein the central tubular member and multi-piece sleeve member are each injection molded.

17. The method for splicing ends of tubing of claim 11, further including a stop rib positioned approximately halfway between each of the first cooperating detent members.

18. A tubing assembly, including:

the splicing apparatus of claim 1 or claim 3 or claim 4;

a first piece of tubing assembled on a first end of the splicing apparatus; and a second piece of tubing assembled on a second end of the splicing apparatus.

19. Apparatus for splicing ends of tubing to each other, including:

a central tubular element having a central passageway to permit fluid communication therethrough and having first cooperating detent members at at least two extremities of the passageway on the exterior of the tubular element; and a sleeve member positioned around said tubular element and having second cooperating detent members positioned in an interference relationship with the first cooperating detent members to retain the sleeve member loose engagement with the central tubular element, the sleeve member being expandable to force the respective cooperating detent members into closer proximity to each other.

* * * * *